United States Patent
Fukui et al.

(10) Patent No.: US 9,106,173 B2
(45) Date of Patent: Aug. 11, 2015

(54) MOTOR DRIVING DEVICE AND METHOD OF PROTECTING MOTOR DRIVING DEVICE

(71) Applicant: HONDA MOTOR CO., LTD., Tokyo (JP)

(72) Inventors: Jirou Fukui, Wako (JP); Fumio Anraku, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 159 days.

(21) Appl. No.: 13/934,224

(22) Filed: Jul. 3, 2013

(65) Prior Publication Data

US 2014/0062373 A1 Mar. 6, 2014

(30) Foreign Application Priority Data

Aug. 28, 2012 (JP) ................. 2012-187203

(51) Int. Cl.
  *H02P 29/00* (2006.01)
  *H02M 1/32* (2007.01)
(52) U.S. Cl.
  CPC ..... *H02P 29/0088* (2013.01); *H02M 2001/327* (2013.01)
(58) Field of Classification Search
  CPC .................................. H02P 29/0088
  USPC .......................... 318/472, 471, 445
  See application file for complete search history.

(56) References Cited

U.S. PATENT DOCUMENTS

| 5,744,927 A * | 4/1998 | Hayashida ............... 318/599 |
| 5,898,557 A * | 4/1999 | Baba et al. ............... 361/103 |
| 6,960,897 B2 * | 11/2005 | Hisamoto et al. ......... 318/434 |

FOREIGN PATENT DOCUMENTS

JP 2010-153567 7/2010

* cited by examiner

*Primary Examiner* — David S Luo
(74) *Attorney, Agent, or Firm* — Mori & Ward, LLP

(57) ABSTRACT

A motor driving device includes a motor driving circuit, an element temperature sensor, a control circuit, an ambient-temperature estimator, and an overheat protection processor. The motor driving circuit has a plurality of switching elements. The element temperature sensor is configured to detect a temperature of each of the switching elements. The ambient-temperature estimator is configured to estimate an ambient temperature around the control circuit based on a temperature of at least one of the switching elements detected by the element temperature sensor if the at least one of the switching elements is not performing the switching operation. The overheat protection processor is configured to execute a first overheat protection process to protect the control circuit from overheating if the ambient temperature around the control circuit estimated by the ambient-temperature estimator exceeds a first overheat criterion temperature.

13 Claims, 6 Drawing Sheets

MOTOR DRIVING DEVICE AND METHOD OF PROTECTING MOTOR DRIVING DEVICE

CROSS-REFERENCE TO RELATED APPLICATIONS

The present application claims priority under 35 U.S.C. §119 to Japanese Patent Application No. 2012-187203, filed Aug. 28, 2012, entitled "Motor Driving Device." The contents of this application are incorporated herein by reference in their entirety.

BACKGROUND OF THE INVENTION

1. Field of the Invention

The present disclosure relates to a motor driving device and a method of protecting the motor driving device.

2. Discussion of the Background

In the related art, a motor driving device is provided with a temperature sensor (e.g. an INV temperature sensor) that detects the temperature of a switching element that constitutes an inverter (for example, see Japanese Unexamined Patent Application Publication No. 2010-153567).

The motor driving device discussed in Japanese Unexamined Patent Application Publication No. 2010-153567 is equipped with a water temperature sensor that detects the temperature of cooling water flowing through a refrigerant passage in the inverter, and compares the detected temperature by the INV temperature sensor with the detected temperature by the water temperature sensor so as to detect defective circulation of the cooling water caused by, for example, a leakage of the cooling water.

SUMMARY OF THE INVENTION

According to one aspect of the present invention, a motor driving device includes a motor driving circuit, an element temperature sensor, a control circuit, an ambient-temperature estimator, and an overheat protection processor. The motor driving circuit has a plurality of switching elements and is configured to perform switching of direct-current power supplied from a power source by using the switching elements so as to output motor driving power for driving a motor. The element temperature sensor is configured to detect a temperature of each of the switching elements. The control circuit is disposed at a position where the control circuit is to be heated by heat released from the switching elements and is configured to control switching operation of the switching elements. The ambient-temperature estimator is configured to estimate an ambient temperature around the control circuit based on a temperature of at least one of the switching elements detected by the element temperature sensor if the at least one of the switching elements is not performing the switching operation. The overheat protection processor is configured to execute a first overheat protection process to protect the control circuit from overheating if the ambient temperature around the control circuit estimated by the ambient-temperature estimator exceeds a first overheat criterion temperature.

According to another aspect of the present invention, in a method of protecting a motor driving device, switching of direct-current power supplied from a power source is performed by using switching elements so as to output motor driving power for driving a motor. A temperature of each of the switching elements is detected by an element temperature sensor. Switching operation of the switching elements is controlled by a control circuit disposed at a position where the control circuit is to be heated by heat released from the switching elements. An ambient temperature around the control circuit is estimated by an ambient-temperature estimator based on a temperature of at least one of the switching elements detected by the element temperature sensor if the at least one of the switching elements is not performing the switching operation. A first overheat protection process is executed to protect the control circuit from overheating if the ambient temperature around the control circuit estimated by the ambient-temperature estimator exceeds a first overheat criterion temperature.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
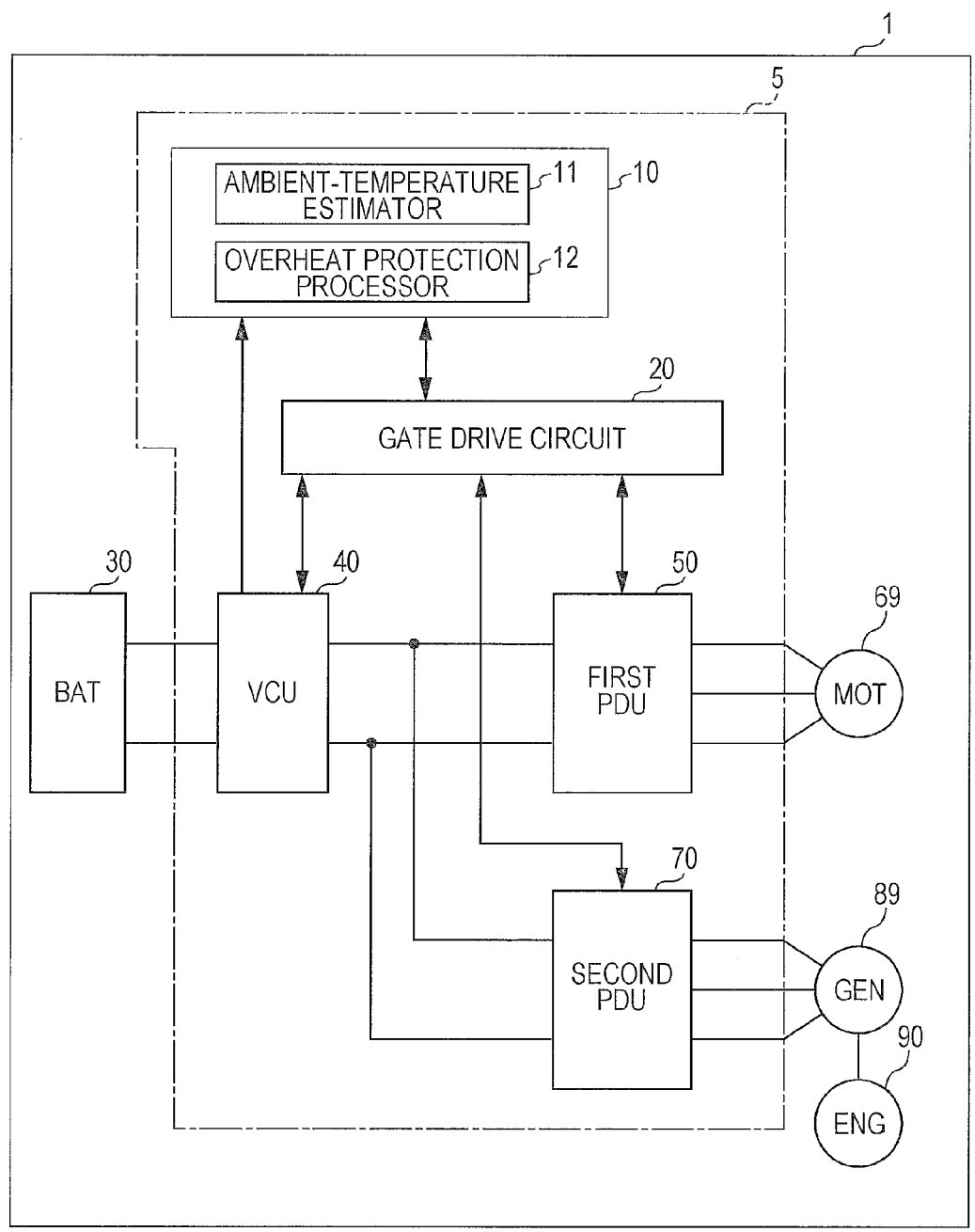
FIG. 1 illustrates the overall configuration of a motor driving device.

The embodiments will now be described with reference to the accompanying drawings, wherein like reference numerals designate corresponding or identical elements throughout the various drawings.

An embodiment of a motor driving device 5 according to the present application will now be described with reference to FIG. 1 to FIG. 6. Referring to FIG. 1, the motor driving device 5 according to this embodiment is installed and used in a hybrid vehicle 1 (corresponding to an electric-motor vehicle according to the present application) equipped with a battery 30 (corresponding to a power source according to the present application), a motor 69, a generator 89, and an engine (internal-combustion engine) 90.

The motor 69 is linked with a driving wheel or wheels (not shown) and outputs a driving force for the hybrid vehicle 1. The generator 89 (corresponding to a power source according to the present application) is driven by the engine 90 and supplies electric power to the motor 69 and charging power to the battery 30.

The motor driving device 5 includes an electronic control unit (ECU) 10 that controls the operation of the motor driving device 5, a voltage control unit (VCU) 40 (corresponding to a boosting circuit according to the present application) that boosts electric power output from the battery 30, a second power drive unit (PDU) 70 (corresponding to a second drive circuit according to the present application) that converts generated electric power (alternating-current power) output from the generator 89 into direct-current power and outputs the direct-current power, a first PDU 50 (corresponding to a first drive circuit according to the present application) that generates electric power for driving the motor 69 (i.e., motor driving power) from the direct-current power output from the VCU 40 or the second PDU 70 and outputs the motor driving power to the motor 69, and a gate drive circuit 20 that controls gate voltages of switching elements (to be described later) provided in the VCU 40, the first PDU 50, and the second PDU 70 so as to set the operation modes of the VCU 40, the first PDU 50, and the second PDU 70.

The ECU 10 and the gate drive circuit 20 correspond to a control circuit according to the present application. The VCU 40, the first PDU 50, and the second PDU 70 correspond to a motor driving circuit according to the present application.

Figure 2:
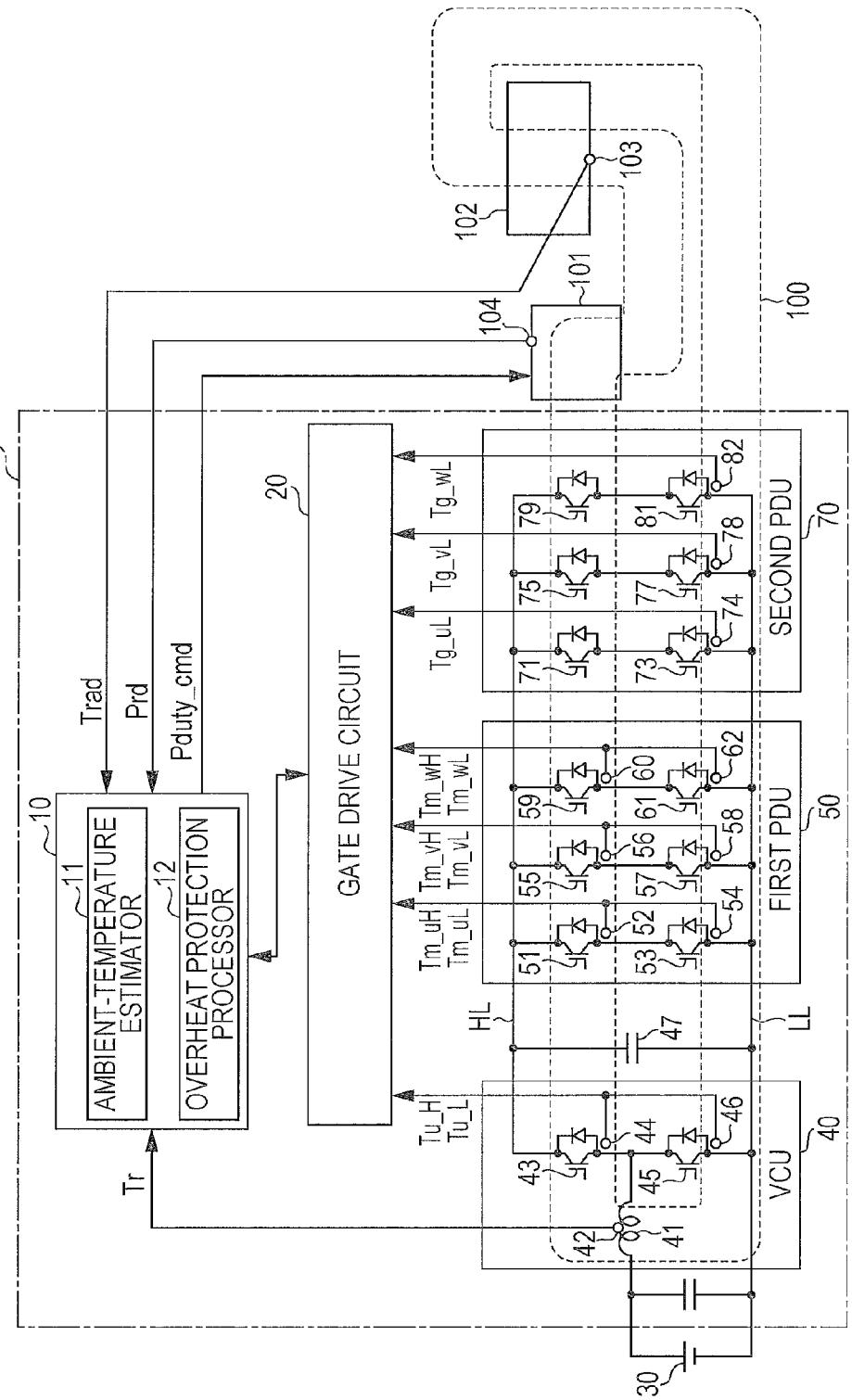
FIG. 2 is a detailed diagram of the motor driving device.

Referring to FIG. 2, the VCU 40 includes an insulated gate bipolar transistor (IGBT) 43 and an IGBT 45 that are series-connected between a high power line HL and a low power line LL, and an induction coil 41 connected between the positive electrode of the battery 30 and a connection point between the IGBT 43 and the IGBT 45.

Furthermore, the VCU 40 includes a coil temperature sensor 42 that detects the temperature of the induction coil 41, an element temperature sensor 44 that detects the temperature of the IGBT 43, and an element temperature sensor 46 that detects the temperature of the IGBT 45. The IGBTs 43 and 45 correspond to switching elements according to the present application. Furthermore, a capacitor 47 is connected between the high power line HL and the low power line LL.

The first PDU 50 includes an IGBT 51 and an IGBT 53 that are series-connected between the high power line HL and the low power line LL and are connected to a U-phase armature coil of the motor 69, an IGBT 55 and an IGBT 57 that are series-connected between the high power line HL and the low power line LL and are connected to a V-phase armature coil of the motor 69, and an IGBT 59 and an IGBT 61 that are series-connected between the high power line HL and the low power line LL and are connected to a W-phase armature coil of the motor 69.

Furthermore, the first PDU 50 includes an element temperature sensor 52 that detects the temperature of the IGBT 51, an element temperature sensor 54 that detects the temperature of the IGBT 53, an element temperature sensor 56 that detects the temperature of the IGBT 55, an element temperature sensor 58 that detects the temperature of the IGBT 57, an element temperature sensor 60 that detects the temperature of the IGBT 59, and an element temperature sensor 62 that detects the temperature of the IGBT 61. The IGBTs 51, 53, 55, 57, 59, and 61 correspond to switching elements according to the present application.

The second PDU 70 includes an IGBT 71 and an IGBT 73 that are series-connected between the high power line HL and the low power line LL and are connected to a U-phase armature coil of the generator 89 (see FIG. 1), an IGBT 75 and an IGBT 77 that are series-connected between the high power line HL and the low power line LL and are connected to a V-phase armature coil of the generator 89, and an IGBT 79 and an IGBT 81 that are series-connected between the high power line HL and the low power line LL and are connected to a W-phase armature coil of the generator 89.

Furthermore, the second PDU 70 includes an element temperature sensor 74 that detects the temperature of the IGBT 73, an element temperature sensor 78 that detects the temperature of the IGBT 77, and an element temperature sensor 82 that detects the temperature of the IGBT 81. The IGBTs 71, 73, 75, 77, 79, and 81 correspond to switching elements according to the present application.

The IGBTs provided in the VCU 40, the first PDU 50, and the second PDU 70 are disposed in contact with a refrigerant passage 100 provided with an electric water pump 101 and a radiator 102 at intermediate sections thereof. When the electric water pump 101 is actuated, water (corresponding to a refrigerant according to the present application) circulates through the refrigerant passage 100 and absorbs heat from the IGBTs, thereby cooling the IGBTs.

The electric water pump 101, the radiator 102, and the refrigerant passage 100 constitute a driving-circuit cooling unit according to the present application. The radiator 102 is provided with a cooling-water temperature sensor 103 that detects the temperature of the cooling water, and inputs a temperature detection signal indicating a detected temperature Trad by the cooling-water temperature sensor 103 to the ECU 10.

The electric water pump 101 is provided with a rotation speed sensor 104 that detects the rotation speed of the electric water pump 101, and inputs a speed detection signal indicating a detected rotation speed Prd by the rotation speed sensor 104 to the ECU 10. In accordance with the temperature Trad of the cooling water and the rotation speed Prd of the electric water pump 101, the ECU 10 determines a speed command Pduty_cmd for the electric water pump 101 and outputs the speed command Pduty_cmd to the electric water pump 101 so that the temperature of the cooling water is maintained within a predetermined range.

Although water is used as the refrigerant in this embodiment, other kinds of refrigerants, such as an antifreeze, may be used as an alternative.

Data containing a detected temperature Tr by the coil temperature sensor 42 of the VCU 40 is output to the ECU 10, and data containing a detected temperature Tu_H by the element temperature sensor 44 and a detected temperature Tu_L by the element temperature sensor 46 are output to the gate drive circuit 20.

Furthermore, data containing a detected temperature Tm_uH by the element temperature sensor 52 of the first PDU 50, a detected temperature Tm_uL by the element temperature sensor 54, a detected temperature Tm_vH by the element temperature sensor 56, a detected temperature Tm_vL by the element temperature sensor 58, a detected temperature Tm_wH by the element temperature sensor 60, and a detected temperature Tm_wL by the element temperature sensor 62 are output to the gate drive circuit 20.

Moreover, a detected temperature Tg_uL by the element temperature sensor 74 of the second PDU 70, a detected Tg_vL by the element temperature sensor 78, and a detected temperature Tg_wL by the element temperature sensor 82 are output to the gate drive circuit 20.

The ECU 10 is an electronic circuit unit constituted of a central processing unit (CPU) and a memory, which are not shown. The ECU 10 makes the CPU execute a program, which is stored in the memory, for driving the motor 69 so as to change the operation modes of the VCU 40, the first PDU 50, and the second PDU 70 via the gate drive circuit 20.

The ECU 10 also includes an ambient-temperature estimator 11 that estimates the ambient temperature around electronic components mounted in the gate drive circuit 20 and the ECU 10 on the basis of temperature detection signals input from the element temperature sensors 44, 46, 52, 54, 56, 58, 60, 62, 74, 78, and 82 (referred to as "individual element temperature sensors" hereinafter) via the gate drive circuit 20, and an overheat protection processor 12 that performs a process for protecting the VCU 40, the first PDU 50, and the second PDU 70 (specifically, the IGBTs 43, 45, 51, 53, 55, 57, 59, 61, 71, 73, 75, 77, 79, and 81 (referred to as "individual IGBTs" hereinafter) provided therein) as well as the ECU 10 and the gate drive circuit 20 (specifically, low-power electronic components equipped therein) from overheating on the basis of the detected temperatures by the individual element temperature sensors and the temperature estimated by the ambient-temperature estimator 11.

Figure 3:
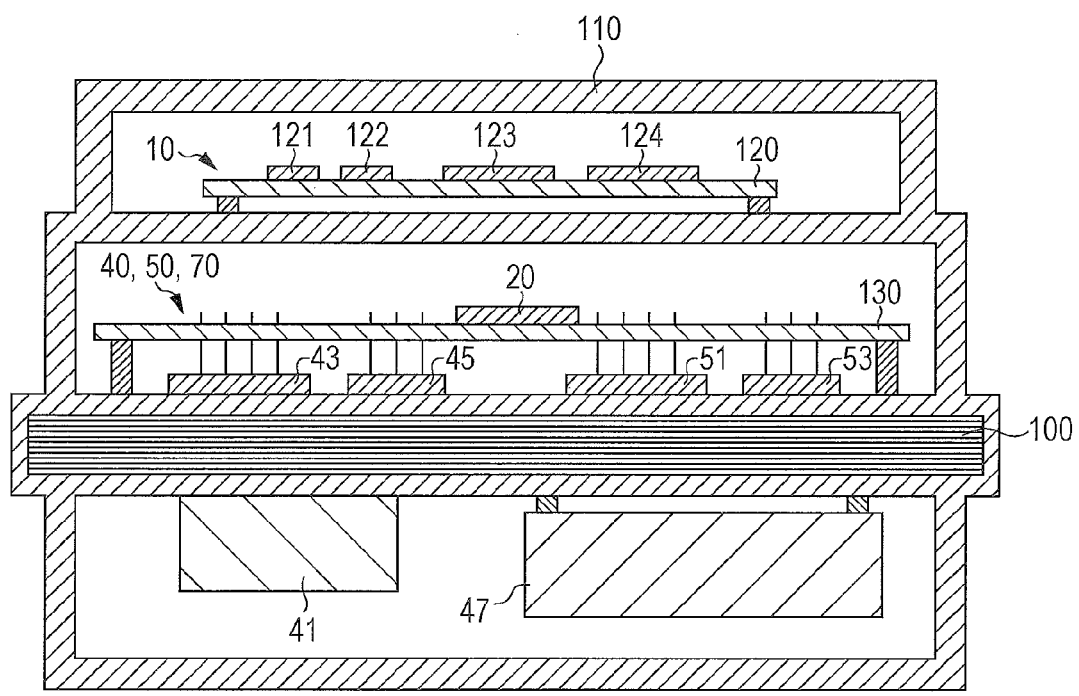
FIG. 3 is a cross-sectional view for explaining the disposition within a housing of the motor driving device.

Referring to FIG. 3, a low-power substrate 120 (equipped with low-power electronic components 121 to 124) constituting the ECU 10 and a high-power substrate 130 equipped with the gate drive circuit 20 on a front surface thereof and the IGBTs 43 and 45 of the VCU 40 and the IGBTs 51 and 53 of the first PDU 50 on a back surface thereof are accommodated within a single housing 110 in which the refrigerant passage 100 is formed.

When performing switching operation, each IGBT generates a large amount of heat. A portion of the heat released from the IGBT propagates through the housing 110 and heats the electronic components mounted in the gate drive circuit 20 and the ECU 10. On the other hand, an IGBT that is not performing switching operation (i.e., an IGBT maintained in a cutoff state or a conductive state) does not release heat or only releases a small amount of heat.

Since the high-power switching elements like the IGBTs and the low-power electronic components mounted in the gate drive circuit 20 and the ECU 10 have different heat-resistant temperatures, it is necessary to monitor their temperatures individually so as to protect them from overheating. However, providing additional temperature sensors for the electronic components mounted in the gate drive circuit 20 and the ECU 10 would lead to an increase in cost required for the temperature sensors. In addition, it would be necessary to provide a space for installing the temperature sensors, which is a problem in that the sizes of the ECU 10 and the gate drive circuit 20 would increase.

In view of the above, the ambient-temperature estimator 11 estimates the ambient temperature around the electronic components mounted in the gate drive circuit 20 and the ECU 10 on the basis of detected temperatures by the element temperature sensors provided for the IGBTs that are not performing switching operation in the VCU 40, the first PDU 50, and the second PDU 70. The overheat protection processor 12 protects the electronic components mounted in the gate drive circuit 20 and the ECU 10 from overheating on the basis of the temperature estimated by the ambient-temperature estimator 11. This eliminates the need to provide dedicated temperature sensors for detecting overheating of the electronic components mounted in the gate drive circuit 20 and the ECU 10.

Figure 4:
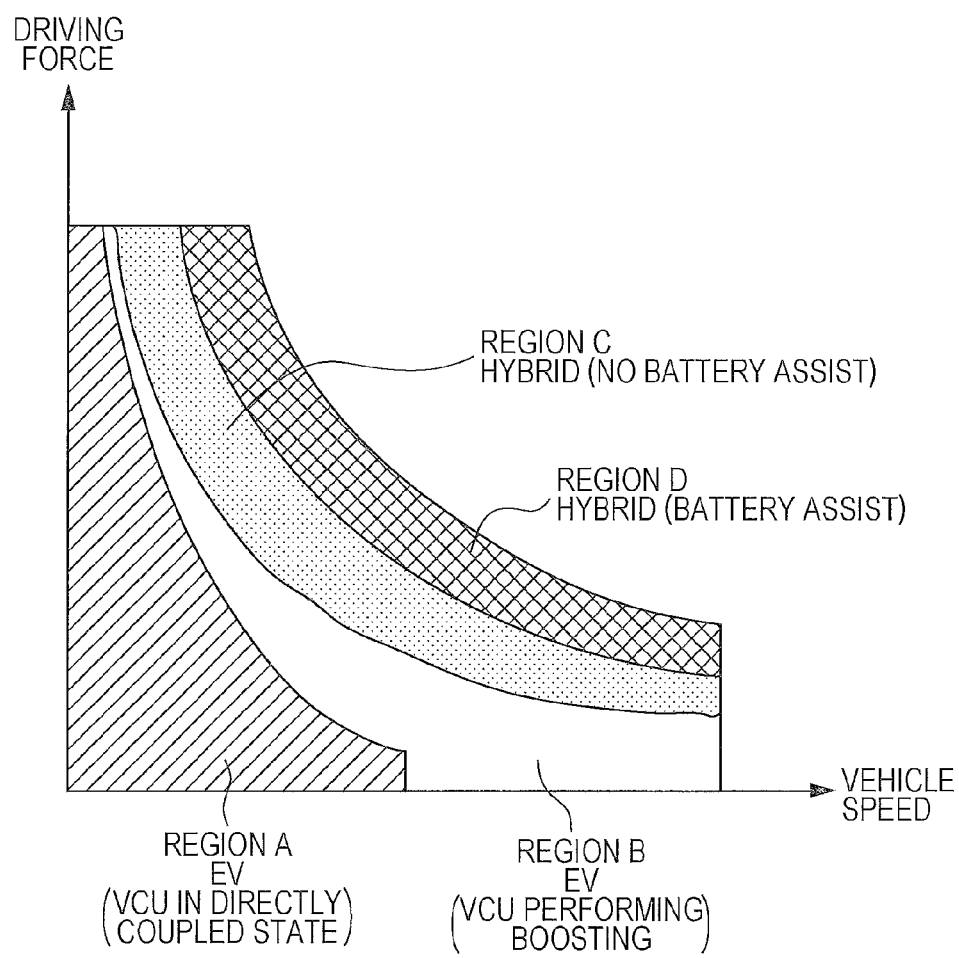
FIG. 4 illustrates the operational statuses of a VCU, a first PDU, and a second PDU in accordance with a driving mode of a hybrid vehicle.

FIG. 4 illustrates the transition of driving modes in the hybrid vehicle 1 and has an ordinate axis denoting a driving force and an abscissa axis denoting a vehicle speed. Region A (i.e., a region filled with diagonal lines) with a large driving force and a low vehicle speed and region B (i.e., a white region) in which the vehicle speed is increased from that in region A correspond to an electric-vehicle (EV) driving mode in which the generator 89 is stopped and the motor 69 is driven only by the electric power from the battery 30.

In region A, the ECU 10 sets the VCU 40 in a directly coupled state (i.e., maintains the IGBT 43 in a conductive state and maintains the IGBT 45 in a cutoff state) so as to supply the electric power output from the battery 30 to the first PDU 50 without boosting the electric power. In region B, the ECU 10 causes the VCU 40 to perform switching operation (to switch the IGBTs 43 and 45) so as to boost the electric power output from the battery 30 before supplying the electric power to the first PDU 50.

Because the operation of the second PDU 70 is stopped during the EV driving mode, the detected temperature by each of the element temperature sensors 74, 78, and 82 provided for the IGBTs 73, 77, and 81 in the second PDU 70 indicates the ambient temperature around the second PDU 70. Since the second PDU 70, the gate drive circuit 20, and the ECU 10 are accommodated within the housing 110 (see FIG. 3), it is assumed that the temperature of each of the IGBTs 73, 77, and 81 in the second PDU 70 and the ambient temperature around the electronic components mounted in the gate drive circuit 20 and the ECU 10 are correlated to each other due to propagation of heat through the housing 110.

In the EV driving mode, the ambient-temperature estimator 11 can estimate the ambient temperature around the electronic components mounted in the gate drive circuit 20 and the ECU 10 on the basis of the detected temperatures by the element temperature sensors 74, 78, and 82 in the second PDU 70. When the temperature estimated by the ambient-temperature estimator 11 exceeds a first overheat criterion temperature (set to, for example, 100° C.), the overheat protection processor 12 performs a process for stopping the operation of all units (i.e., the ECU 10, the gate drive circuit 20, the VCU 40, the first PDU 50, and the second PDU 70) in the motor driving device 5 so as to protect the electronic components and the IGBTs mounted in the units from overheating. This process corresponds to a first overheat protection process according to the present application.

Furthermore, the overheat protection processor 12 monitors the temperature of each IGBT that is performing switching. When the temperature exceeds a second overheat criterion temperature (set to, for example, 150° C.), the overheat protection processor 12 performs a process for stopping the operation of the unit (i.e., the VCU 40, the first PDU 50, or the second PDU 70) equipped with the IGBT whose temperature has exceeded the second overheat criterion temperature, thus protecting the IGBT from overheating. This process corresponds to a second overheat protection process according to the present application.

Since the VCU 40 is in a directly coupled state and the IGBTs 43 and 45 are not performing switching operation in region A, the ambient temperature around the electronic components mounted in the gate drive circuit 20 and the ECU 10 may be estimated on the basis of the detected temperatures by the element temperature sensors 44 and 46 in the VCU 40 (preferably, the detected temperature by the element temperature sensor 46 for the IGBT 45 in a cutoff state).

In FIG. 4, region C (i.e., a region filled with dots) and region D (i.e., a region filled with grid lines) in which the vehicle speed is higher than that in region B correspond to a hybrid driving mode in which electric power is generated by the generator 89 and the motor 69 is driven by the electric power output from the generator 89.

In region C, the ECU 10 makes the motor 69 operate only with the electric power from the generator 89, and the VCU 40 is in a stopped state (i.e., the IGBTs 43 and 45 are maintained in a cutoff state). Therefore, the ambient-temperature estimator 11 estimates the ambient temperature around the electronic components mounted in the gate drive circuit 20 and the ECU 10 on the basis of the detected temperatures by the element temperature sensors 44 and 46 in the VCU 40.

In region D, the ECU 10 makes the motor 69 operate with both the electric power from the generator 89 and the electric power from the battery 30. In this case, if the VCU 40 is not performing boosting, the ambient temperature around the electronic components mounted in the gate drive circuit 20 and the ECU 10 can be estimated on the basis of the detected temperatures by the element temperature sensors 44 and 46 in the VCU 40 (preferably, the detected temperature by the element temperature sensor 46 in a cutoff state).

On the other hand, when the VCU 40 is performing boosting, the IGBTs 43 and 45 in the VCU 40 perform switching operation and thus generate heat. Therefore, the ambient temperature around the electronic components mounted in the gate drive circuit 20 and the ECU 10 cannot be estimated on the basis of the detected temperatures by the element temperature sensors 44 and 46 in the VCU 40.

Thus, when the VCU 40 is performing boosting, the ECU 10 performs a process, to be described later, for protecting the IGBTs 43 and 45 from overheating on the basis of the detected temperatures by the element sensors 44 and 46 in the VCU 40.

Figure 5:
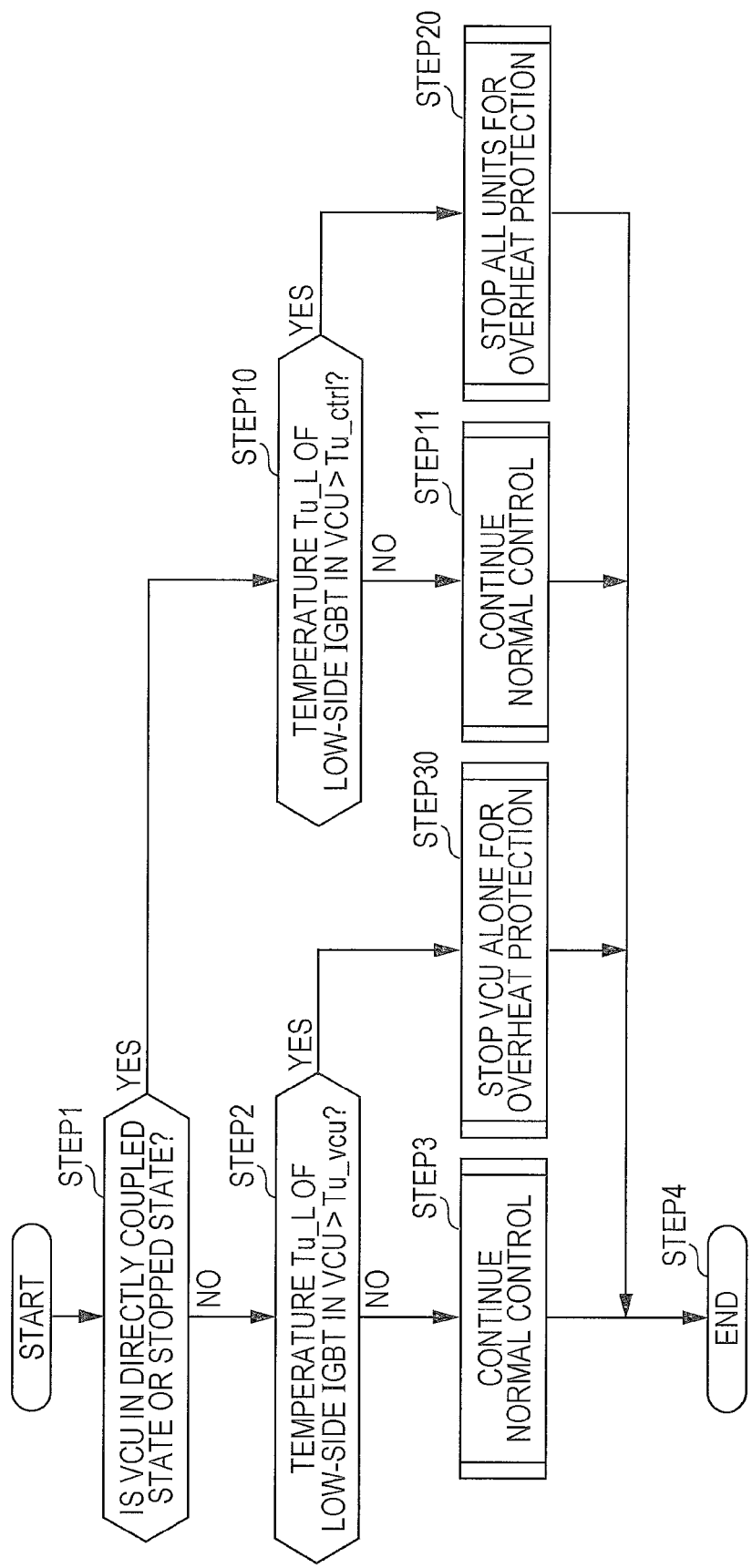
FIG. 5 is a flowchart of an overheat protection process based on a detected temperature in the VCU.

Next, a procedure for a process executed by the overheat protection processor 12 in the ECU 10 for protecting the VCU 40, the gate drive circuit 20, and the ECU 10 from overheating on the basis of the detected temperature by the element temperature sensor 46 for the low-side IGBT 45 of the VCU 40 will be described with reference to a flowchart shown in FIG. 5.

In step 1, the overheat protection processor 12 determines whether or not the VCU 40 is in a directly coupled state (i.e., a state where the high-side IGBT 43 is maintained in a conductive state and the low-side IGBT 45 is maintained in a cutoff state) or in a stopped state (i.e., a state where the high-side IGBT 43 and the low-side IGBT 45 are both maintained in a cutoff state).

If the VCU 40 is in a directly coupled state or a stopped state, the process proceeds to step 10. If the VCU 40 is not in either of a directly coupled state or a stopped state (i.e., if the VCU 40 is in a boosting state), the process proceeds to step 2.

Steps 10 to 11 and step 20 correspond to when the VCU 40 is in a directly coupled state or a stopped state. In step 10, the overheat protection processor 12 determines whether or not the detected temperature Tu_L by the element temperature sensor 46 for the low-side IGBT 45 exceeds a first overheat criterion temperature Tu_ctrl for the gate drive circuit 20 and the ECU 10. In this case, the first overheat criterion temperature Tu_ctrl is set to, for example, 100° C. in accordance with the heat-resistant temperature of the electronic components mounted in the gate drive circuit 20 and the ECU 10.

In this embodiment, although the ambient-temperature estimator 11 estimates the ambient temperature around the electronic components mounted in the gate drive circuit 20 and the ECU 10 directly from the detected temperature Tu_L by the element temperature sensor 46, the ambient temperature around the electronic components mounted in the gate drive circuit 20 and the ECU 10 may alternatively be estimated by correcting the detected temperature Tu_L by the element temperature sensor 46 in accordance with, for example, the disposition of the VCU 40, the gate drive circuit 20, and the ECU 10.

If the detected temperature Tu_L by the element temperature sensor 46 exceeds the first overheat criterion temperature Tu_ctrl, the process proceeds to step 20 from step 10. In this case, the overheat protection processor 12 determines that the electronic components mounted in the gate drive circuit 20 and the ECU 10 are possibly overheated and performs a process (corresponding to a first overheat protection process according to the present application) for stopping the operation of all units (i.e., the ECU 10, the gate drive circuit 20, the VCU 40, the first PDU 50, and the second PDU 70) in the motor driving device 5. In this case, the hybrid vehicle 1 becomes inoperable. Then, the process proceeds to step 4 where the process ends.

On the other hand, if the detected temperature Tu_L by the element temperature sensor 46 is lower than or equal to the first overheat criterion temperature Tu_ctrl, the process proceeds to step 11 from step 10. In this case, the overheat protection processor 12 determines that the electronic components mounted in the gate drive circuit 20 and the ECU 10 are not overheated and allows normal control to continue. Then, the process proceeds to step 4 where the process ends.

Steps 2 to 3 and step 30 correspond to when the VCU 40 is performing switching operation. In step 2, the overheat protection processor 12 determines whether or not the detected temperature Tu_L by the element temperature sensor 46 for the low-side IGBT 45 exceeds a second overheat criterion temperature Tu_vcu for the IGBT 45. In this case, the second overheat criterion temperature Tu_vcu is set to, for example, 150° C. in accordance with the heat-resistant temperature of the IGBT 45.

If the detected temperature Tu_L by the element temperature sensor 46 exceeds the second overheat criterion temperature Tu_vcu, the process proceeds to step 30 from step 2. In this case, the overheat protection processor 12 performs a process (corresponding to a second overheat protection process according to the present application) for stopping the operation of the VCU 40 (i.e., setting the IGBTs 43 and 45 in a cutoff state) so as to protect the IGBT 45 from overheating. In this case, the hybrid vehicle 1 becomes incapable of running in the EV driving mode. Then, the process proceeds to step 4 where the process ends.

On the other hand, if the detected temperature Tu_L by the element temperature sensor 46 is lower than or equal to the second overheat criterion temperature Tu_vcu, the process proceeds to step 3 from step 2. In this case, the overheat protection processor 12 determines that the VCU 40 and the electronic components mounted in the gate drive circuit 20 and the ECU 10 are not overheated and allows normal control to continue. Then, the process proceeds to step 4 where the process ends.

Figure 6:
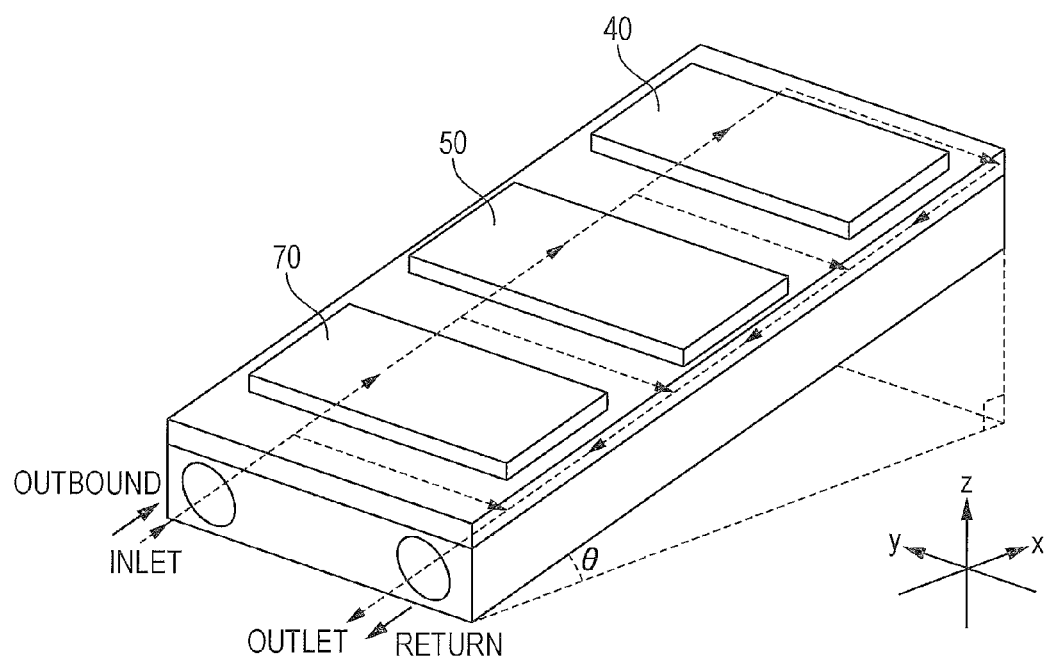
FIG. 6 illustrates the disposition of a cooling-water circulation passage, the VCU, the first PDU, and the second PDU.

Referring to FIG. 6, the refrigerant passage 100 for cooling the VCU 40, the first PDU 50, and the second PDU 70 is inclined (by θ in FIG. 6) relative to the bottom surface (i.e., an x-y plane in FIG. 6) of the hybrid vehicle 1 so that the height of the refrigerant passage 100 (i.e., the height in the z direction, which is the vertical direction) gradually increases in the outbound direction of the water and so that the height of the refrigerant passage 100 gradually decreases in the return direction of the water. In the vertical direction of the refrigerant passage 100, the VCU 40 is disposed at the highest position, the first PDU 50 is disposed at the second highest position, and the second PDU 70 is disposed at the lowest position among the three units.

In the case where the VCU 40, the first PDU 50, and the second PDU 70 are arranged in that order from the highest position in the vertical direction in this manner, if the flow rate of the water flowing through the refrigerant passage 100 decreases due to a leakage occurring from the refrigerant passage 100, the temperatures of the IGBTs 43 and 45 would particularly increase during boosting performed by the VCU 40, which is disposed at the highest position and in which the degree of decrease in the water flow rate is large.

In view of this, when the VCU 40 is performing boosting, the overheat protection processor 12 monitors the detected temperatures Tu_H and Tu_L of the IGBTs 43 and 45 in the VCU 40 with higher priority over those of other IGBTs. Thus, when a leakage occurs from the refrigerant passage 100, the overheat protection processor 12 quickly detects overheating of the IGBTs 43 and 45 in the VCU 40 caused by a lack of cooling and stops the operation of the VCU 40 so that the IGBTs 43 and 45 can be protected.

Furthermore, when the detected temperature Tu_H or Tu_L of the IGBT 43 or 45 in the VCU 40 exceeds the first overheat criterion temperature Tu_ctrl, the process for stopping the operation of all units (i.e., the ECU 10, the gate drive circuit 20, the VCU 40, the first PDU 50, and the second PDU 70) in the motor driving device 5 is performed so that electronic components in other circuits can be protected from overheating.

In this embodiment, the detected temperatures Tu_H and Tu_L of the IGBTs 43 and 45 in the VCU 40 are monitored with high priority since the VCU 40 is disposed at the highest position in the vertical direction of the refrigerant passage 100. Alternatively, among IGBTs that are performing switching operation, the temperature of an IGBT that is cooled by the refrigerant passage 100 at the highest position thereof in the vertical direction may be monitored with high priority in accordance with the disposition of the IGBTs, whereby the IGBTs and the electronic components in other units can be protected from overheating when a leakage occurs from the refrigerant passage 100. In this case, it is preferable that an IGBT that performs switching operation most frequently be disposed so as to be cooled by the refrigerant passage 100 at the highest position thereof in the vertical direction.

Furthermore, although the motor driving device 5 according to the present application is installed in a hybrid vehicle as an example in this embodiment, the present application is applicable to other types of electric vehicles, such as an electric automobile or a fuel-cell vehicle, so long as the vehicle has a configuration for driving a motor with electric power supplied from a power source.

Furthermore, although the switching elements according to the present application are described as being IGBTs in this embodiment, other types of switching elements, such as field-effect transistors (FETs), may alternatively be used.

Furthermore, although a control circuit (i.e., the ECU 10 and the gate drive circuit 20) and a motor driving circuit (i.e., the VCU 40, the first PDU 50, and the second PDU 70) are accommodated within the housing 110 and heat is propagated therethrough by air in this embodiment, as shown in FIG. 3, the housing 110 may alternatively be filled with cooling gel. As another alternative, the control circuit and the motor driving circuit may be integrally sealed by resin instead of being accommodated within a housing.

According to an aspect of the embodiment, a motor driving device includes a motor driving circuit that has a plurality of switching elements and that performs switching of direct-current power supplied from a power source by using the switching elements so as to output motor driving power for driving a motor; an element temperature sensor that detects a temperature of each switching element; a control circuit that is disposed at a position where the control circuit is heated by heat released from the switching elements and that controls switching operation of the switching elements; an ambient-temperature estimator that estimates an ambient temperature around the control circuit on the basis of the temperature of at least one of the switching elements when the at least one switching element is not performing the switching operation, the temperature of the at least one switching element being detected by the element temperature sensor; and an overheat protection processor that executes a first overheat protection process for protecting the control circuit from overheating when the ambient temperature around the control circuit estimated by the ambient-temperature estimator exceeds a first overheat criterion temperature.

Accordingly, the element temperature sensor detects the temperature of each of the switching elements, and the ambient-temperature estimator estimates the ambient temperature around the control circuit on the basis of the temperature of the at least one switching element that is not performing the switching operation. The overheat protection processor executes the first overheat protection process when the ambient temperature around the control circuit estimated by the ambient-temperature estimator exceeds the first overheat criterion temperature. This eliminates the need to provide a dedicated temperature sensor for protecting electronic components mounted in the control circuit from overheating. Thus, the reliability for protecting the entire device from overheating can be ensured while an increase in cost and an increase in installation space caused by providing a temperature sensor for the control circuit are suppressed.

In the above aspect of the embodiment, the motor driving circuit and the control circuit may be accommodated within a single housing, and the heat released from the switching elements propagates through the housing and heats the control circuit.

Accordingly, since the motor driving circuit and the control circuit are accommodated within the same housing, the heat released from a switching element performing the switching operation propagates through the housing and heats the periphery of the control circuit and a switching element, which is not performing the switching operation and is thus not releasing heat or releasing a small amount of heat, to about the same temperature. In this case, because the temperature of the switching element not performing the switching operation and the ambient temperature around the control circuit change correlatively to each other, the ambient-temperature estimator can accurately estimate the ambient temperature around the control circuit on the basis of the temperature of the switching element not performing the switching operation.

In the above aspect of the embodiment, the motor driving circuit may include a boosting circuit that has at least one of the switching elements and that boosts the direct-current power supplied from the power source by causing the at least one switching element to perform the switching operation. When the boosting circuit is not performing the boosting, the ambient-temperature estimator may estimate the ambient temperature around the control circuit on the basis of the temperature of the at least one switching element in the boosting circuit, the temperature being detected by the element temperature sensor.

Accordingly, when the boosting circuit is not performing the boosting and the motor driving circuit is using the non-boosted direct-current power supplied from the power source, the ambient-temperature estimator can estimate the ambient temperature around the control circuit on the basis of the temperature of the at least one switching element in the boosting circuit.

In the above aspect of the embodiment, the overheat protection processor may execute a second overheat protection process for protecting at least one of the switching elements performing the switching operation from overheating when the temperature of the at least one switching element detected by the element temperature sensor exceeds a second overheat criterion temperature that is higher than the first overheat criterion temperature.

Accordingly, when the temperature of the at least one switching element performing the switching operation exceeds the second overheat criterion temperature, the second overheat protection process is executed, whereby the at least one switching element can be prevented from being maintained in an overheated state.

In the above configuration, the motor, the motor driving circuit, and the control circuit may be installed in an electric-motor vehicle. Moreover, the motor driving device may further include a driving-circuit cooling unit that has a refrigerant passage and that cools the switching elements of the motor driving circuit by supplying a refrigerant to the refrigerant passage. The refrigerant passage may be disposed in the electric-motor vehicle while being in contact with the motor driving circuit such that a height of the refrigerant passage in a vertical direction gradually increases in an outbound direction of the refrigerant and the height of the refrigerant in the vertical direction gradually decreases in a return direction of the refrigerant. The overheat protection processor may execute the second overheat protection process when the temperature of at least one of the switching elements performing the switching operation exceeds the second overheat criterion temperature, the at least one switching element being cooled by the refrigerant at a highest position of the refrigerant passage in the vertical direction, the temperature of the at least one switching element being detected by the element temperature sensor.

Accordingly, since the refrigerant passage is disposed such that the height of the refrigerant passage in the vertical direction gradually increases in the outbound direction of the refrigerant and the height of the refrigerant in the vertical direction gradually decreases in the return direction of the refrigerant, the degree of decrease in the flow rate of the refrigerant in the refrigerant passage when the refrigerant leaks from the refrigerant passage increases with increasing height in the vertical direction. Therefore, when the refrigerant leaks from the refrigerant passage, the at least one switching element performing the switching operation, which is cooled by the refrigerant at the highest position of the refrigerant passage in the vertical direction, is most insufficiently cooled, causing the temperature of this switching element to increase.

Thus, when the temperature of the aforementioned switching element that is cooled by the refrigerant at the highest position of the refrigerant passage in the vertical direction exceeds the second overheat criterion temperature, the overheat protection processor executes the second overheat protection process so that the switching elements in the motor driving circuit can be quickly protected from overheating when the refrigerant leaks from the refrigerant passage.

In the above aspect of the embodiment, the motor, the motor driving circuit, and the control circuit may be installed in an electric-motor vehicle. Moreover, the motor driving device may further include a driving-circuit cooling unit that has a refrigerant passage and that cools the switching elements of the motor driving circuit by supplying a refrigerant to the refrigerant passage. The refrigerant passage may be disposed in the electric-motor vehicle while being in contact with the motor driving circuit such that a height of the refrigerant passage in a vertical direction gradually increases in an outbound direction of the refrigerant and the height of the refrigerant in the vertical direction gradually decreases in a return direction of the refrigerant. The overheat protection processor may execute the first overheat protection process when the temperature of at least one of the switching elements performing the switching operation exceeds the first overheat criterion temperature, the at least one switching element being cooled by the refrigerant at a highest position of the refrigerant passage in the vertical direction, the temperature of the at least one switching element being detected by the element temperature sensor.

Accordingly, since the refrigerant passage is disposed such that the height of the refrigerant passage in the vertical direction gradually increases in the outbound direction of the refrigerant and the height of the refrigerant in the vertical direction gradually decreases in the return direction of the refrigerant, the degree of decrease in the flow rate of the refrigerant in the refrigerant passage when the refrigerant leaks from the refrigerant passage increases with increasing height in the vertical direction. Therefore, when the refrigerant leaks from the refrigerant passage, the at least one switching element performing the switching operation, which is cooled by the refrigerant at the highest position of the refrigerant passage in the vertical direction, is most insufficiently cooled, causing the temperature of the switching element to increase. With the increase in the temperature of this switching element, the ambient temperature around the control circuit also increases.

Thus, when the temperature of the aforementioned switching element that is cooled by the refrigerant at the highest position of the refrigerant passage in the vertical direction exceeds the first overheat criterion temperature, the overheat protection processor executes the first overheat protection process so that the electronic components mounted in the control circuit can be quickly protected from overheating when the refrigerant leaks from the refrigerant passage.

In the above aspect of the embodiment, the motor, the motor driving circuit, and the control circuit may be installed in an electric-motor vehicle equipped with a generator. The motor driving circuit may include a boosting circuit that has a first switching element of the plurality of switching elements included in the motor driving circuit, a first drive circuit that has a second switching element of the plurality of switching elements included in the motor driving circuit and is connected to the boosting circuit and the motor, and a second drive circuit that has a third switching element of the plurality of switching elements included in the motor driving circuit and is connected to the first drive circuit and the generator. The boosting circuit boosts the direct-current power supplied from the power source by causing the first switching element to perform the switching operation. The first drive circuit generates the motor driving power from the direct-current power output from the boosting circuit by causing the second switching element to perform the switching operation, and outputs the motor generating power to the motor. The second drive circuit converts electric power output from the generator into direct-current power by causing the third switching element to perform the switching operation, and outputs the direct-current power to the first drive circuit. The ambient-temperature estimator may estimate the ambient temperature around the control circuit on the basis of the temperature of the switching element provided in one of the boosting circuit, the first drive circuit, and the second drive circuit in which the switching operation of the switching element is not performed, the temperature being detected by the element temperature sensor.

Accordingly, the ambient-temperature estimator can efficiently estimate the ambient temperature around the control circuit on the basis of the temperature of the switching element provided in one of the boosting circuit, the first drive circuit, and the second drive circuit in which the switching operation of the switching element is not performed.

Obviously, numerous modifications and variations of the present invention are possible in light of the above teachings. It is therefore to be understood that within the scope of the appended claims, the invention may be practiced otherwise than as specifically described herein.

What is claimed is:

1. A motor driving device comprising:
   a motor driving circuit that has a plurality of switching elements and that is configured to perform switching of direct-current power supplied from a power source by using the switching elements so as to output motor driving power for driving a motor;
   an element temperature sensor configured to detect a temperature of each of the switching elements;

a control circuit that is disposed at a position where the control circuit is to be heated by heat released from the switching elements and that is configured to control switching operation of the switching elements;
an ambient-temperature estimator configured to estimate an ambient temperature around the control circuit based on a temperature of at least one of the switching elements detected by the element temperature sensor if the at least one of the switching elements is not performing the switching operation; and
an overheat protection processor configured to execute a first overheat protection process to protect the control circuit from overheating if the ambient temperature around the control circuit estimated by the ambient-temperature estimator exceeds a first overheat criterion temperature,
wherein the ambient-temperature estimator estimates the ambient temperature around the control circuit which generates a smaller amount of heat than the plurality of switching elements based on the temperature detected by the element temperature sensor which detects the temperature of the plurality of switching elements which generates a larger amount of heat than the control circuit.

2. The motor driving device according to claim 1, wherein the motor driving circuit and the control circuit are accommodated within a single housing, and the heat released from the switching elements propagates through the single housing and heats the control circuit.

3. The motor driving device according to claim 1, wherein the motor driving circuit includes a boosting circuit that has at least one of the switching elements and that is configured to boost the direct-current power supplied from the power source by causing the at least one of the switching elements of the boosting circuit to perform the switching operation, and
wherein if the boosting circuit is not boosting the direct-current power, the ambient-temperature estimator estimates the ambient temperature around the control circuit based on a temperature of the at least one of the switching elements of the boosting circuit detected by the element temperature sensor.

4. The motor driving device according to claim 1, wherein the overheat protection processor executes a second overheat protection process to protect at least one of the switching elements performing the switching operation from overheating if a temperature of the at least one of the switching elements detected by the element temperature sensor exceeds a second overheat criterion temperature that is higher than the first overheat criterion temperature.

5. The motor driving device according to claim 4, further comprising:
a driving-circuit cooler that has a refrigerant passage and that is provided to cool the switching elements of the motor driving circuit by supplying a refrigerant to the refrigerant passage, the refrigerant passage being disposed in an electric-motor vehicle while being in contact with the motor driving circuit such that a height of the refrigerant passage in a vertical direction gradually increases in an outbound direction of the refrigerant and the height of the refrigerant passage in the vertical direction gradually decreases in a return direction of the refrigerant,
wherein the motor, the motor driving circuit, and the control circuit are installed in the electric-motor vehicle, and
wherein the overheat protection processor executes the second overheat protection process if a temperature of at least one of the switching elements which is performing the switching operation and which is cooled by the refrigerant at a highest position of the refrigerant passage in the vertical direction exceeds the second overheat criterion temperature, the temperature of the at least one of the switching elements being detected by the element temperature sensor.

6. The motor driving device according to claim 1, further comprising:
a driving-circuit cooler that has a refrigerant passage and that is provided to cool the switching elements of the motor driving circuit by supplying a refrigerant to the refrigerant passage, the refrigerant passage being disposed in an electric-motor vehicle while being in contact with the motor driving circuit such that a height of the refrigerant passage in a vertical direction gradually increases in an outbound direction of the refrigerant and the height of the refrigerant passage in the vertical direction gradually decreases in a return direction of the refrigerant,
wherein the motor, the motor driving circuit, and the control circuit are installed in the electric-motor vehicle, and
wherein the overheat protection processor executes the first overheat protection process if a temperature of at least one of the switching elements which is performing the switching operation and which is cooled by the refrigerant at a highest position of the refrigerant passage in the vertical direction exceeds the first overheat criterion temperature, the temperature of the at least one of the switching elements being detected by the element temperature sensor.

7. The motor driving device according to claim 1, wherein the motor, the motor driving circuit, and the control circuit are installed in an electric-motor vehicle equipped with a generator,
wherein the motor driving circuit includes
a boosting circuit including a first switching element of the plurality of switching elements included in the motor driving circuit,
a first drive circuit that has a second switching element of the plurality of switching elements included in the motor driving circuit and is connected to the boosting circuit and the motor, and
a second drive circuit that has a third switching element of the plurality of switching elements included in the motor driving circuit and is connected to the first drive circuit and the generator,
wherein the boosting circuit is configured to boost the direct-current power supplied from the power source by causing the first switching element to perform the switching operation,
wherein the first drive circuit is configured to generate the motor driving power from the direct-current power output from the boosting circuit by causing the second switching element to perform the switching operation and is configured to output the motor generating power to the motor, and
wherein the second drive circuit is configured to convert electric power output from the generator into direct-current power by causing the third switching element to perform the switching operation and is configured to output the direct-current power to the first drive circuit, and
wherein the ambient-temperature estimator estimates the ambient temperature around the control circuit based on a temperature of a switching element in which the switching operation is not perform among the first switching element, the second switching element, and the third switching element, the temperature of the switching element being detected by the element temperature sensor.

8. The motor driving device according to claim 1,
wherein the overheat protection processor is configured to stop operation of each of the motor driving circuit and the control circuit in the first overheat protection process.

9. The motor driving device according to claim 1,
wherein the first overheat protection process includes stopping an operation of the control circuit to protect the control circuit from overheating if the ambient temperature around the control circuit estimated by the ambient-temperature estimator exceeds the first overheat criterion temperature.

10. A motor driving device comprising:
motor driving means for performing switching of direct-current power supplied from a power source by using switching elements so as to output motor driving power for driving a motor, the motor driving means including a plurality of switching elements;
element temperature detecting means for detecting a temperature of each of the switching elements;
control means for controlling switching operation of the switching elements, the control means being disposed at a position where the control means is to be heated by heat released from the switching elements;
ambient-temperature estimating means for estimating an ambient temperature around the control means based on a temperature of at least one of the switching elements detected by the element temperature detecting means if the at least one of the switching elements is not performing the switching operation; and
overheat protection processing means for executing a first overheat protection process to protect the control means from overheating if the ambient temperature around the control means estimated by the ambient-temperature estimating means exceeds a first overheat criterion temperature,
wherein the ambient-temperature estimating means estimates the ambient temperature around the control means which generates a smaller amount of heat than the plurality of switching elements based on the temperature detected by the element temperature detecting means which detects the temperature of the plurality of switching elements which generates a larger amount of heat than the control means.

11. The motor driving device according to claim 10,
wherein the first overheat protection process includes stopping an operation of the control means to protect the control means from overheating if the ambient temperature around the control means estimated by the ambient-temperature estimating means exceeds the first overheat criterion temperature.

12. A method of protecting a motor driving device, comprising:
performing switching of direct-current power supplied from a power source by using switching elements so as to output motor driving power for driving a motor;
detecting a temperature of each of the switching elements by an element temperature sensor;
controlling switching operation of the switching elements by a control circuit disposed at a position where the control circuit is to be heated by heat released from the switching elements;
estimating an ambient temperature around the control circuit by an ambient-temperature estimator based on a temperature of at least one of the switching elements detected by the element temperature sensor if the at least one of the switching elements is not performing the switching operation; and
executing a first overheat protection process to protect the control circuit from overheating if the ambient temperature around the control circuit estimated by the ambient-temperature estimator exceeds a first overheat criterion temperature,
wherein the ambient-temperature estimator estimates the ambient temperature around the control circuit which generates a smaller amount of heat than the at least one of the switching elements based on the temperature detected by the element temperature sensor which detects the temperature of the at least one of the switching elements which generates a larger amount of heat than the control circuit.

13. The method according to claim 12,
wherein the first overheat protection process includes stopping an operation of the control circuit to protect the control circuit from overheating if the ambient temperature around the control circuit estimated by the ambient-temperature estimator exceeds the first overheat criterion temperature.

* * * * *